Dec. 31, 1935.  G. J. DE VOOYS  2,026,343
PROCESS AND APPARATUS FOR SEPARATING MATERIALS
OF DIFFERENT SPECIFIC GRAVITY
Filed June 2, 1933  2 Sheets-Sheet 1

Inventor
GERARD JAN DE VOOYS
By
Attorneys

Dec. 31, 1935.　　　G. J. DE VOOYS　　　2,026,343
PROCESS AND APPARATUS FOR SEPARATING MATERIALS
OF DIFFERENT SPECIFIC GRAVITY
Filed June 2, 1933　　2 Sheets-Sheet 2

Inventor
GERARD JAN DE VOOYS
By
Attorneys

Patented Dec. 31, 1935

2,026,343

UNITED STATES PATENT OFFICE 2,026,343

PROCESS AND APPARATUS FOR SEPARATING MATERIALS OF DIFFERENT SPECIFIC GRAVITY

Gerard Jan de Vooys, Huckelhoven, Kreis Erkelenz, Germany

Application June 2, 1933, Serial No. 673,946
In Germany June 4, 1932

5 Claims. (Cl. 209—173)

The invention relates to processes and apparatus for separating materials of different specific gravity, and has to do more particularly with the separation of coal from heavier stone and other materials by means of a concentration liquid of predetermined specific gravity.

In processes for the concentration of coal, the coal is separated from the heavier stone in a liquid of suitable specific gravity due to the fact that the stone sinks to the bottom while the coal, which floats, is carried away. If sand be used to increase the specific gravity of the liquid, very finely ground sand must be kept uniformly distributed in water by constant and active movement of the bath. The sand process which necessitates great fineness of grinding of the sand has also the disadvantage that the specific gravity of the concentration liquid varies according to the excellence of the sand distribution in the water, for which reason the greatest possible care must be devoted to the movement and mixing of the bath.

The process according to the present invention avoids these defects by providing that the concentration liquid contains intimately distributed therein such substances for determining its specific gravity which are so suspended that an emulsion is produced which is as stable as an aqueous solution. In addition to the homogeneity of this emulsion there is the advantage that, in spite of its high specific gravity, it has a low viscosity, whereby the concentration process is greatly accelerated and made largely independent of the size of the pieces of the material to be concentrated. The improved process thus permits of concentrating dust-free coal within wide limits of size, without difficulty.

The concentration liquid consists of a sludge of clay and barytes in water, both substances being added in such proportions that the specific gravity of the prepared concentration liquid corresponds approximately to or is slightly above the specific gravity of the coal to be concentrated. As compared with sand, barytes has the great advantage that on account of its softness it can be easily ground to the finest size of grain. On account of its softness, also, it causes no wear of the apparatus, coatings, and the like. The greater specific gravity of the barytes also necessitates a less quantity to attain the necessary specific gravity of the liquid. The peculiar phenomenon is also evidenced that the barytes is readily deposited from a very diluted emulsion so that the recovery of the barytes adhering to the concentrated coal is easily possible by washing and depositing.

The concentration process can also be accelerated and improved by producing a slight upflow in the upper layer of the concentration liquid and a slight downward flow in the lower layer of the liquid, by means of weak circulation currents. The upflow keeps the coal particles better on the surface, while not preventing the sinking of the gangue which, in the lower layer of liquid, sinks very rapidly in consequence of the downflow and can be conveyed out of the container, which is of importance in particular for the fine constituents. The speed of the ascending liquid can, for example, be 0.1" per second, and that of the descending liquid 0.3" per second.

The rich part (coal) collecting on the surface of the liquid is drawn off by an endless rake conveyor, while the submerged residue (gangue) is removed from the sump of the concentrating installation by a bucket conveyor.

An example of a concentrating installation according to the invention is shown in the accompanying drawings, wherein:—

Fig. 3 shows a detail.

Figure 1:
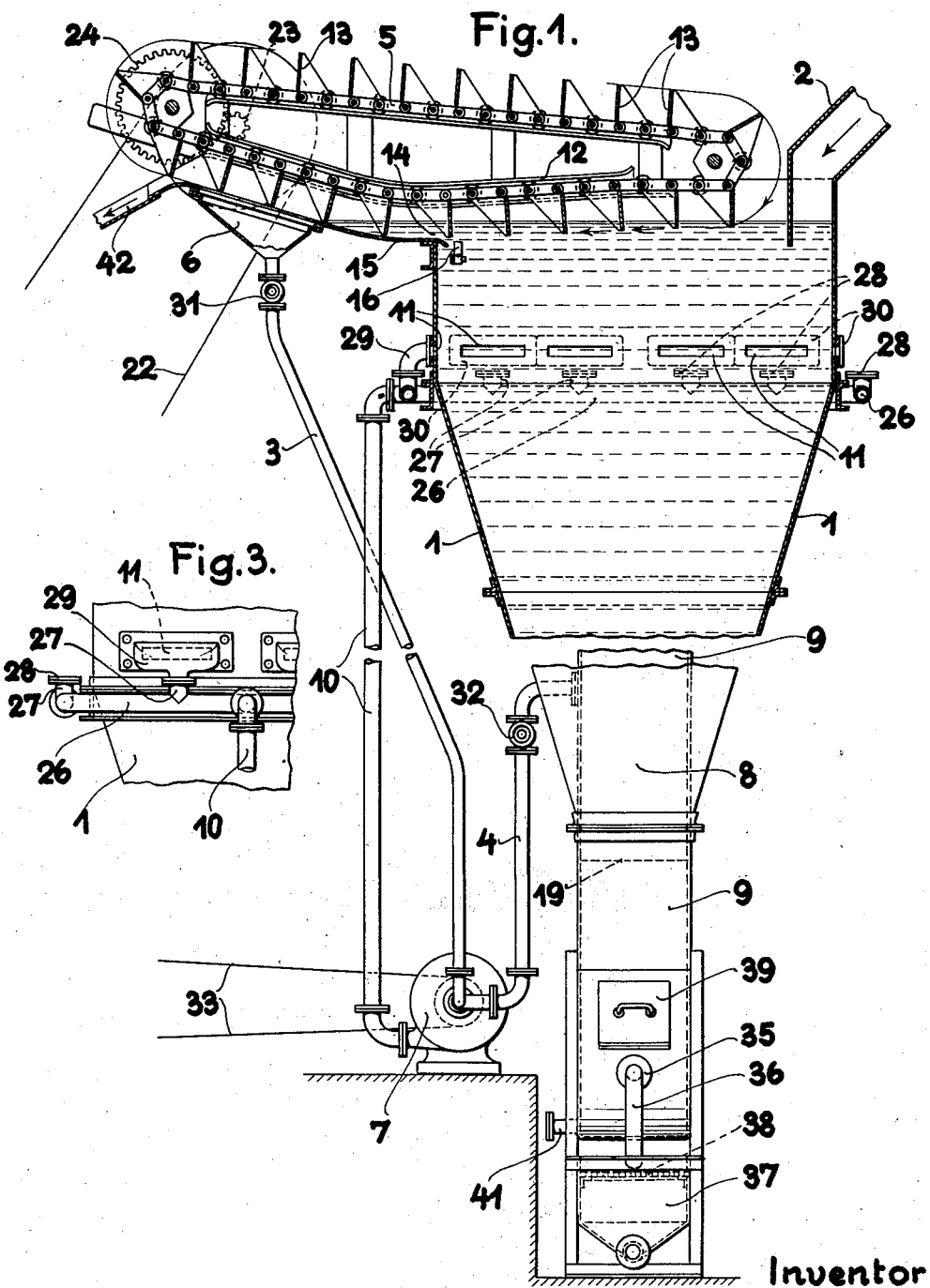
Fig. 1 is a transverse vertical section.
Figure 2:
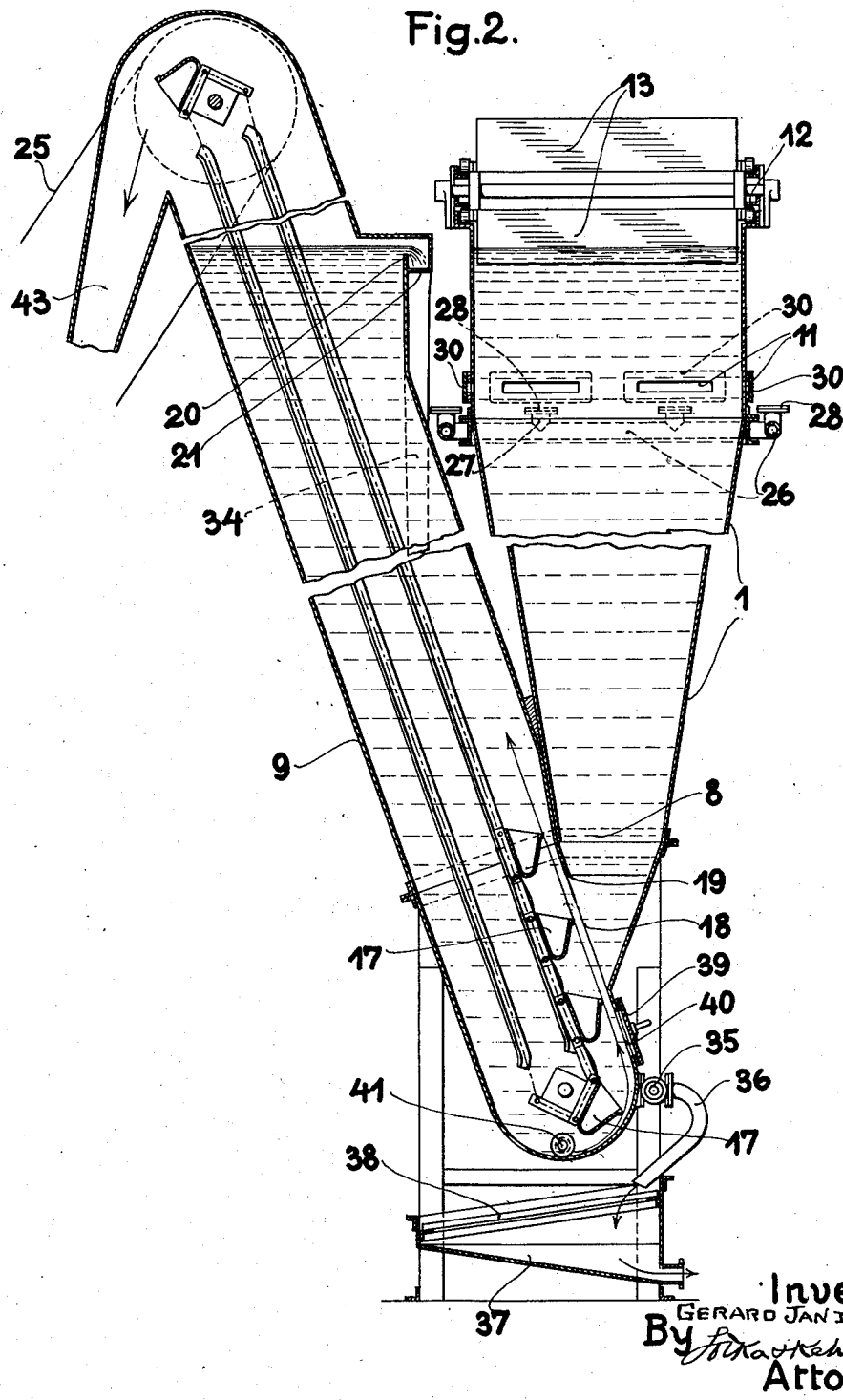
Fig. 2 is a longitudinal vertical section through the installation.

The screened lump coal is supplied to the container 1 filled with the concentration liquid, through the hopper 2. Due to the flotation buoyancy, the coal is uniformly distributed in the bath. The rake band 5, driven by means of a belt 22 and gear wheels 23, 24, combs off the floating rich part (coal) from the surface of the bath and brings it into the discharge hopper 6, from which the drips of concentration liquid are returned into the bath by the circulation while the particles of coal pass to a slide 42. From the hopper 8 of the concentrating container 1, a bucket conveyor (generally indicated at 9) driven by a belt 25 carries the waste residue (stone) on to a slide 43. The bucket conveyor 9 and concentrating container 1 may be connected below the level of the liquid by a separate pipe. Both a pipe 3 from the hopper 6 as well as a pipe 4 from the housing of the conveyor 9, or from the float discharge 21, lead for example to a pump 7 or the like, driven by a belt 33, which again delivers the liquid supplied to it through a conduit 10 and openings 11 into the container 1. The container 1 is surrounded underneath the openings 11 by an annular pipe 26 to which is connected the pipe 10 coming from the pump 7. In front of each opening 11 the pipe 26 has a connector 27 which can be shut off as desired by a cover 28, or can be connected by means of a bend 29 to the corresponding opening 11 after taking off the cover 30 closing this opening. The cover 30 as also the bend 29 are sealed with respect to the container 1 by strips or frames of rubber or the like. Preferably only certain openings 11 or certain groups of openings are connected on to the pump pipe in order to produce a predetermined degree of circulation in the bath. The quantity of liquid circulating through the hopper 6 is much less than the quantity of liquid removed from the bucket conveyor casing 9, so that in the container 1 there is a slight upwardly directed flow above the openings 11 and a greater downwardly directed movement in the bath below these openings. The quantities of liquid circulating in the pipes 3 and 4 may be varied by built-in regulating members 31 and 32. If the pipe 10 be connected, as shown, at the one side of the head of the container 1, then the concentrating liquid at the surface of the bath is set in horizontal movement towards the draining container 6, whereby the operation of the rake extractor is assisted.

The walls of the container 1 are vertically disposed as far as the inlet openings 11 distributed around the periphery thereof and are then directed inwardly and downwardly to the hopper-shaped part at a steep inclination, they being inclined by at least 70° to the horizontal. The walls are perfectly smooth inside; ribs, bolts and rivets are avoided in order to prevent a deposit of portions of the sinking material, as this might lead to clogging. The lower run of the discharge chain 5 is so guided by strips 12 that the rakes 13 on entering the liquid only dip slightly thereinto but gradually dip more deeply as they approach the outlet 14 until dipping below the floating layer of coal particles. The result is hereby attained that the pieces of coal floating upwards are seized in a gentle manner and driven without injurious pushing together towards the outlet. For this purpose, there may also be produced, by suitable employment of the openings 11, a slight flow of liquid moving in the direction of the outlet. The guides of the chain 5, 13 must be made horizontal at the outlet point itself where the rakes slide over the base plate 15 of the outlet, in order that a jamming together of the particles of coal between the said parts may be avoided. With the same object, there is arranged in front of the outlet point a grate 16 or the like, the parts of which, for example, consist of rubber and can easily yield in the direction of the outlet to a pressure of the coal particles. They may, however, also consist of wood and be made to swing, so that they are held by buoyancy in the position shown.

The transition of the steep walls of the container 1 into the casing of the bucket conveyor 9 is so made that dropping of portions of the sinking material past the buckets 17 is prevented, in order to avoid a reduction of such parts on the bottom of the bucket conveyor housing. For this purpose, the plane containing the edges of the outlet opening 18 of the container 1 is located parallel with the direction of movement of the buckets, the outer bucket edges running along close on to this opening. The sharp upper transition edge 19 from the opening 18 to the casing 9 permits any pieces of coal passing alongside or between the buckets at once to float up in the bucket conveyor casing. There is consequently no possibility that they may remain fixed at the point of transition and produce clogging or be exposed to reduction. The pieces of coal floating up in the conveyor casing, the upward floating of which is much facilitated by the space between the buckets 17 and the casing wall being enlarged behind the edge 19, are floated over at an enlarged overflow 20 of the casing, which permits the unhindered collection of the upwardly driven pieces of coal, into a float outlet 21, at the point where the level of the liquid is the same as the level of the liquid in the container 1, by means of the current impulses produced by the movements occurring, the pieces of coal being carried on to a washing device from the float outlet 21 by means of a rake or the like. The bath liquid carried along can be delivered through the pipe 34 to the pump 7 and be thereby returned into the container 1. The drawing-off from the bucket conveyor casing 9 takes place through a pipe 36 closable by a cock 35 and which carries the liquid mixed with particles of coal to an open weir 37 so that drifting particles of coal are washed out and can be recovered by screening on a grid 38. By means of an opening 40 adapted to be closed by a cover 39, the lower part of the casing 9 can be inspected and be cleaned from excess residue. The last bottom residues can be removed through the opening 41.

The coal and gangue are washed. The sludge running off is freed from coal dust or gangue dust. The clay and barytes mixture is rapidly deposited from the pure sludge on account of the high dilution thereof and is carried back to the concentration liquid.

I claim:—

1. In an apparatus for separating materials of different specific gravity by introducing the same into a separating liquid of high specific gravity which is stable without agitation, the combination of a container for holding the separating liquid, means for removing the separated floating material from said liquid, means communicating with said container at its lower portion for removing the separated sunken material from said liquid, circulating means for removing transported separating liquid from the two material removing means and in greater volume per unit time from the second than from the first, and a connection leading from said circulating means to said container at a predetermined point below the surface of the liquid therein whereby the transported liquid is returned to the container and develops therein a weak upward current toward the surface of the liquid and a coincidental stronger downward current toward the means for removing the separated sunken material.

2. In an apparatus for separating materials of different specific gravity, the combination of a container for holding a separating liquid and having an outlet chute, an endless discharging device movably mounted at the upper portion of said container and provided with a plurality of spaced rakes, means whereby said rakes are caused to dip into said liquid initially to a gradually increasing extent and subsequently to a gradually decreasing extent toward said outlet, means for operating said discharging device and a yielding grid located in front of the inlet end to said outlet chute and adapted to yield in the direction of said outlet chute under the pressure of the particles of coal being removed by said discharging device whereby jamming of said coal is prevented.

3. In an apparatus for separating coal from relatively heavier materials, the combination of a funnel-shaped container for the separating liquid, an obliquely rising conveyor casing communicating at its lower end with the lower portion of said container through a connecting opening, the upper periphery of said opening being defined by a sharp edge, an endless bucket conveyor movably mounted in said conveyor casing, the latter being of increased width upwardly beyond the sharp edge of said connecting opening to permit pieces of coal carried by said bucket conveyor to float freely upward in said casing, and an overflow discharge at the upper end of the conveyor casing adapted to receive said floating pieces of coal.

4. An apparatus for separating coal from relatively heavier materials comprising a funnel-shaped container holding a gravity fluid, a discharge slide spaced from the upper end of said container, a draining funnel disposed between said slide and said container, a bucket conveyor casing connected at its lower end with the lower end of the container, an overflow discharge arranged at the upper end of the bucket conveyor casing, a liquid-circulating means, conduit connections from the draining funnel and overflow discharge to the container and opening thereinto below the surface of the liquid therein, means for operating said liquid-circulating means to produce an upwardly directed flow in the upper portion of the liquid in the said container and a coincidental downwardly directed flow in the lower portion of said liquid through nozzle-like openings formed around the periphery thereof.

5. In a process for separating materials of different specific gravity, the step of introducing such materials into a body of a separating liquid consisting of a mixture of clay and barytes in a finely divided condition suspended in water.

GERARD JAN DE VOOYS.